UNITED STATES PATENT OFFICE.

AUGUSTUS HENRY TAIT, OF JERSEY CITY, NEW JERSEY, ASSIGNOR TO HIMSELF AND WILLIAM J. MARRIN, OF NEW YORK, N. Y.

IMPROVEMENT IN THE MANUFACTURE OF CARBON BLACK FOR PIGMENT.

Specification forming part of Letters Patent No. 148,778, dated March 17, 1874; application filed September 16, 1873.

*To all whom it may concern:*

Be it known that I, AUGUSTUS HENRY TAIT, of Jersey City, Hudson county, New Jersey, have invented a certain Process for the Manufacture of Carbon Black, suitable for printing-ink, black paint, and other purposes, of which the following is a specification:

Take of cane sugar, glucose, grape or starch sugar, sirup, or molasses, one hundred pounds, according to the quality of carbon black required, the finest white sugar making the best article; place it in a suitable vessel, provided with a steam-coil or steam-jacket; dilute the sugar with water to form a thick sirup—say, 35° Baumé; warm up with the steam to about 100° Fahrenheit; then add, by degrees, while stirring the sirup, twenty pounds of bichloride of tin, which should contain nearly equal parts of acid and metal; then heat up the mass, with agitation, to 200° Fahrenheit, or thereabout; continue the heat and agitation at that temperature for four hours. The process is completed when the mass of carbon black shows a brilliant and fine jet-black shade. The process may be hastened by a larger addition of bichloride, but I find a better result by extending the time and curtailing the chemical.

I do not limit myself to the use of the bichloride of tin, as I can obtain similar results with chlorides of zinc, mercury, or other metallic chlorides, but I prefer the bichloride of tin.

The process differs from the formation of caramel in producing a larger proportion of carbon.

When the carbon black is intended to be mixed with oils or varnish, as in making up a pigment for paint or for printers' ink, it requires to be evaporated at a moderate temperature, by any of the appropriate methods in use for that purpose, and then ground up with the oil and varnish.

I claim—

The process for the manufacture of carbon black, by means of metallic chlorides or bichlorides applied to saccharine matter, substantially as set forth.

A. H. TAIT.

Witnesses:
EDM. F. BROWN,
GEO. W. STOKES.